(12) United States Patent
Kim et al.

(10) Patent No.: US 11,709,919 B2
(45) Date of Patent: Jul. 25, 2023

(54) METHOD AND APPARATUS OF ACTIVE IDENTITY VERIFICATION BASED ON GAZE PATH ANALYSIS

(71) Applicant: Electronics and Telecommunications Research Institute, Daejeon (KR)

(72) Inventors: Ho-Won Kim, Seoul (KR); Jang-Hee Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 17/081,725

(22) Filed: Oct. 27, 2020

(65) Prior Publication Data

US 2021/0294883 A1    Sep. 23, 2021

(30) Foreign Application Priority Data

Mar. 20, 2020  (KR) .................... 10-2020-0034540

(51) Int. Cl.
  *G06F 21/31*  (2013.01)
  *G06F 21/32*  (2013.01)
  *G06N 3/08*  (2023.01)
  *G06V 10/60*  (2022.01)
  *G06V 40/40*  (2022.01)
  (Continued)

(52) U.S. Cl.
  CPC ............. *G06F 21/31* (2013.01); *G06F 21/32* (2013.01); *G06N 3/08* (2013.01); *G06V 10/60* (2022.01); *G06V 40/16* (2022.01); *G06V 40/165* (2022.01); *G06V 40/171* (2022.01); *G06V 40/172* (2022.01); *G06V 40/18* (2022.01); *G06V 40/193* (2022.01); *G06V 40/197* (2022.01); *G06V 40/40* (2022.01)

(58) Field of Classification Search
  CPC ....... G06F 21/31; G06F 21/32; G06N 3/0454; G06N 3/08; G06V 10/60; G06V 40/16; G06V 40/165; G06V 40/171; G06V 40/172; G06V 40/18; G06V 40/193; G06V 40/197; G06V 40/40
  See application file for complete search history.

(56) References Cited

U.S. PATENT DOCUMENTS

| | | | |
|---|---|---|---|
| 6,714,665 B1 * | 3/2004 | Hanna | G06V 40/19 382/209 |
| 7,873,189 B2 | 1/2011 | Jee et al. | |
| 7,929,734 B2 | 4/2011 | Jung et al. | |

(Continued)

FOREIGN PATENT DOCUMENTS

| | | |
|---|---|---|
| JP | 2017010459 A | 1/2017 |
| JP | 2019197426 A | 11/2019 |

(Continued)

OTHER PUBLICATIONS

Karakaya, "Deep Learning Frameworks for Off-Angle Iris Recognition", IEEE, 2018, (Year: 2018).*

*Primary Examiner* — Ruiping Li
(74) *Attorney, Agent, or Firm* — William Park & Associates Ltd.

(57) ABSTRACT

Disclosed herein are a method and apparatus for active identification based on gaze path analysis. The method may include extracting the face image of a user, extracting the gaze path of the user based on the face image, verifying the identity of the user based on the gaze path, and determining whether the face image is authentic.

20 Claims, 10 Drawing Sheets

(51) Int. Cl.
*G06V 40/16* (2022.01)
*G06V 40/18* (2022.01)

(56) References Cited

U.S. PATENT DOCUMENTS

| | | |
|---|---|---|
| 8,856,541 B1 | 10/2014 | Chaudhury et al. |
| 10,102,358 B2 | 10/2018 | Wilder |
| 10,248,844 B2 | 4/2019 | Kim et al. |
| 10,282,530 B2 | 5/2019 | Gordon |
| 2015/0302252 A1* | 10/2015 | Herrera .................. G06V 40/70 |
| | | 382/117 |
| 2021/0201021 A1* | 7/2021 | Novelli ..................... G06T 7/73 |

FOREIGN PATENT DOCUMENTS

| | | |
|---|---|---|
| KR | 100842258 B1 | 6/2008 |
| KR | 101706992 B1 | 2/2017 |
| KR | 1020170018666 A | 2/2017 |
| KR | 101946253 B1 | 2/2019 |
| KR | 1020190100838 A | 8/2019 |

* cited by examiner

METHOD AND APPARATUS OF ACTIVE IDENTITY VERIFICATION BASED ON GAZE PATH ANALYSIS

CROSS REFERENCE TO RELATED APPLICATION

This application claims the benefit of Korean Patent Application No. 10-2020-0034540, filed on Mar. 20, 2020, which is hereby incorporated by reference in its entirety into this application.

BACKGROUND OF THE INVENTION

1. Technical Field

The present invention relates generally to a method and apparatus for active identification based on gaze path analysis, and more particularly to technology 15 capable of detecting falsification of identity and actively verifying the identity of a user by checking the gaze path of the user in a terminal, such as a smartphone, a camera, a door lock, a kiosk, or the like equipped with a camera and an adjustable illuminator.

2. Description of the Related Art

Unless otherwise indicated herein, the materials described in this section are not prior art with regard to the claims in this application, and are not admitted to be prior art by inclusion in this section.

Image-recognition-based identification technology using biometric information, such as face recognition, iris recognition, or the like, is currently used in various systems requiring identity verification.

Recently, in such authentication systems, spoofing using a previously captured image or video has become a growing issue.

Accordingly, various methods for detecting spoofing have been proposed.

Patent Document 1 cited below discloses a method for checking liveness, which is configured to detect spoofing by determining whether or not a gaze is moving in order to follow a pattern provided through the control of a GUI on a screen.

In this case, the method disclosed in Patent Document 1 enables detection of liveness, but does not propose a method for enhancing identification.

Patent Document 2 discloses a method for detecting spoofing by determining whether the movement of a gaze matches a pattern provided on a screen, in addition to the method disclosed in Patent Document 1.

In this case, the method disclosed in Patent Document 2 may have the problem of complexity in implementation because a calibration or customization process suitable for the characteristics of an eyeball of each user is required in order to guarantee the accuracy of eye-tracking when whether the gaze matches a target displayed on a screen is determined.

Also, Patent Document 3 discloses a method of requesting a change in a facial expression and determining whether the facial expression changed in response to the request matches previously stored information in order to detect spoofing and enhance security.

Here, the method disclosed in Patent Document 3 enables enhanced identification using a unique change in the shape of a face surface, which appears when each user changes a facial expression, but has a problem that it is vulnerable to spoofing using previously recorded video.

Therefore, the present invention intends to propose a user-friendly identification method based on image recognition and analysis performed in a contactless manner, which may provide high reliability by enhancing both security and detection of spoofing while minimizing the energy invested by a user for identification by simply detecting a series of gaze points.

DOCUMENTS OF RELATED ART (Patent Document 1) U.S. Pat. No. 8,856,541B, registered on Oct. 7, 2014 and titled "Liveness Detection".
(Patent Document 2) U.S. Ser. No. 10/102,358B2, registered on Oct. 16, 2018 and titled "Face-controlled liveness verification".
(Patent Document 3) U.S. Ser. No. 10/282,530B2, registered on May 7, 2019 and titled "Verifying identity based on facial dynamics".

SUMMARY OF THE INVENTION

An object of the present invention is to determine whether a subject is a real person using the face image of the user and illumination capable of changing the brightness.

Another object of the present invention is to provide high-level identification technology by checking the unique time-series gaze path of a user.

A further object of the present invention is to provide technology enabling a user to generate a gaze path without a display.

Yet another object of the present invention is to extract an accurate gaze path regardless of an eye shape, which is different for each user.

The technical objects of the present invention are not limited to the above technical objects, and other technical objects that are not mentioned will be readily understood from the following description.

In order to accomplish the above objects, a method for active identification based on gaze path analysis according to an embodiment the present invention may include extracting the face image of a user, extracting the gaze path of the user based on the face image, verifying the identity of the user based on the gaze path, and determining whether the face image is authentic.

Here, verifying the identity of the user may be configured to verify the identity of the user by comparing the gaze path with a registered gaze path corresponding to the unique ID of the user.

Here, the registered gaze path may be set without a guide for directing a fixed gaze position by extracting the position and direction of a pupil of the user, setting a position at which the pupil maintains a stationary state for a certain time period as a gaze position, and connecting the gaze position in a time-ordered sequence.

Here, extracting the gaze path may include extracting face information of the user from the face image, extracting the eye area of the user based on the face information, normalizing the eye area based on the face information, and extracting the gaze path based on the normalized eye area.

Here, the face information may include face shape information, feature information including feature points of ears, eyes, a mouth, and a nose, and a head pose corresponding to the inclination of a face, extracting the eye area may be configured to extract the eye area based on the face shape information, the feature information, and the head pose, and normalizing the eye area may be configured to normalize the eye area based on yaw/pitch information corresponding to the head pose such that the eye area is directed straight ahead.

Here, extracting the gaze path based on the eye area may be configured to extract areas corresponding to an iris and a sclera from the normalized eye area and to extract the gaze path based on a change in shapes of the iris and sclera.

Here, the method may further include illuminating the face of the user, and determining whether the face image is authentic may include extracting information about the effect of illumination from the face image and determining whether the face image is authentic based on the information about the effect of the illumination.

Here, illuminating the face of the user may be configured to illuminate the face of the user after randomly setting at least one of the brightness of the illumination, the color thereof, and the location at which the illumination is provided.

Here, determining whether the face image is authentic based on the illumination about the effect of the illumination may include extracting 3D face shape information from the face image, extracting information about a predicted shading effect of the illumination based on the 3D face shape information, and determining whether the face image is authentic by comparing the information about the effect of the illumination with the information about the predicted shading effect of the illumination.

Here, extracting the 3D face shape information may be configured to extract the 3D face shape information using a deep-learning method based on a convolutional neural network (CNN), which receives the face image as input.

Also, in order to accomplish the above objects, an apparatus for active identification based on gaze path analysis according to an embodiment of the present invention may include one or more processors and executable memory for storing at least one program executed by the one or more processors. The at least one program may be configured to extract the face image of a user, extract the gaze path of the user based on the face image, verify the identity of the user based on the gaze path, and determine whether the face image is authentic.

Here, the at least one program may verify the identity of the user by comparing the gaze path with a registered gaze path corresponding to the unique ID of the user.

Here, the registered gaze path may be set without a guide for directing a fixed gaze position by extracting the position and direction of a pupil of the user, setting a position at which the pupil maintains a stationary state for a certain time period as a gaze position, and connecting the gaze position in a time-ordered sequence.

Here, the at least one program may extract the face information of the user from the face image, extract the eye area of the user based on the face information, normalize the eye area based on the face information, and extract the gaze path based on the normalized eye area.

Here, the face information may include face shape information, feature information including feature points of ears, eyes, a mouth, and a nose, and a head pose corresponding to the inclination of the face, and the at least one program may extract the eye area based on the face shape information, the feature information, and the head pose and normalize the eye area based on yaw/pitch information corresponding to the head pose such that the eye area is directed straight ahead.

Here, the at least one program may extract areas corresponding to an iris and a sclera from the normalized eye area and extract the gaze path based on a change in the shapes of the iris and sclera.

Here, the at least one program may extract the face image of the user after illuminating the face of the user, extract information about the effect of illumination from the face image, and determine whether the face image is authentic based on the information about the effect of the illumination.

Here, the at least one program may illuminate the face of the user after randomly setting at least one of the brightness of the illumination, the color thereof, and the location at which the illumination is provided.

Here, the at least one program may extract 3D face shape information from the face image, extract information about a predicted shading effect of the illumination based on the 3D face shape information, and determine whether the face image is authentic by comparing the information about the effect of the illumination with the information about the predicted shading effect of the illumination.

Here, the at least one program may extract the 3D face shape information using a deep-learning method based on a convolutional neural network (CNN), which receives the face image as input.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
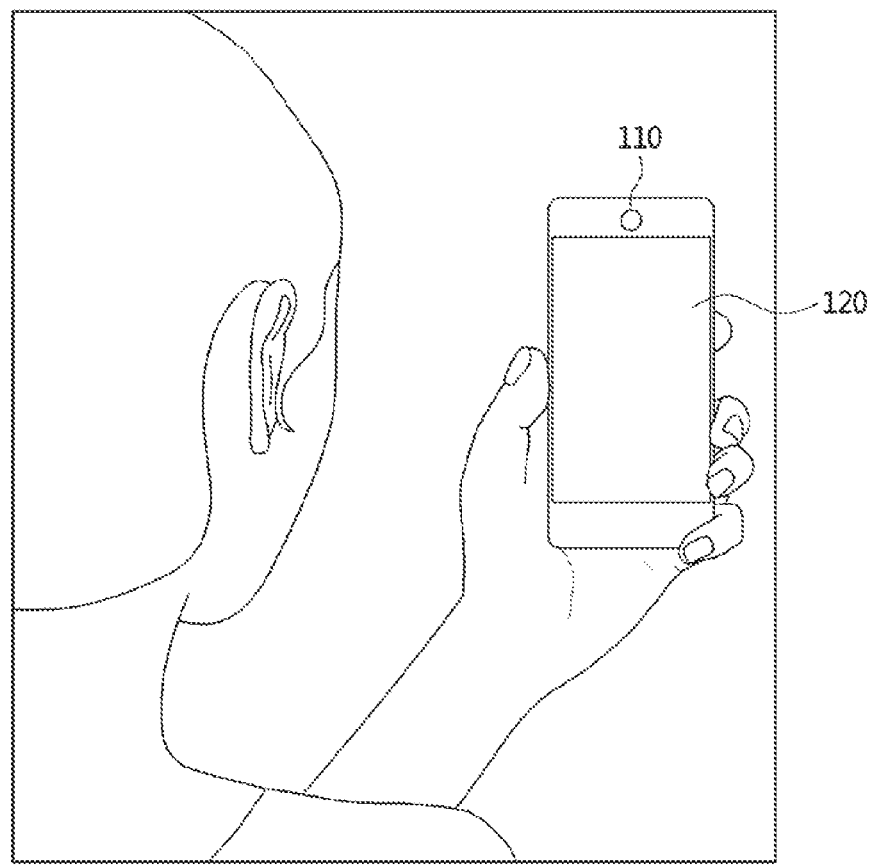
FIG. 1 is an exemplary view illustrating the use of an apparatus for active identification based on gaze path analysis according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

The present invention relates to a method and apparatus for active identification based on gaze path analysis, and relates to technology capable of detecting falsification of identity and actively verifying the identity of a user by checking the gaze path of the user in a terminal, such as a smartphone, a camera, a door lock, a kiosk, or the like equipped with a camera and an adjustable illuminator.

Specifically, an embodiment of the present invention may be implemented as a system equipped with a video camera capable of capturing an image of the face of a user, such as a webcam or the like, and an illumination module capable of actively controlling on/off operation of an illuminator or the color of illumination.

An embodiment of the present invention is configured to capture an image of the face of a user within an acceptable distance, within which a change in color caused by controlling the distance or illumination can be identified, and to determine, based on face shape information, whether a change in the brightness or color of the face caused by active illumination control appears as natural shades in the captured image, thereby determining whether the subject is a real person.

Also, an embodiment of the present invention is configured to compare gaze path information that is input in real time with gaze path information that has been stored in connection with previously set identification information, thereby determining whether the identification information input in real time matches the previously stored identification information.

Also, an embodiment of the present invention enables active identification by determining both whether the subject is a real person and whether identification information input in real time matches previously stored identification information.

An embodiment of the present invention may respond to spoofing, which can be caused when identification is performed through existing image-based face recognition, while minimizing the amount of energy consumed for identification, and may provide high-level active identification capable of improving user convenience.

Also, based on the above-described configuration and effects, an embodiment of the present invention may be generally used for identification requiring a high level of security by being applied to a mobile terminal, such as a mobile phone or the like, an embedded terminal, such as a door lock or the like, and an installation-type terminal, such as a kiosk or the like.

Hereinafter, a preferred embodiment of the present invention will be described in detail with reference to the accompanying drawings.

FIG. 1 is an exemplary view illustrating the use of an apparatus for active identification based on gaze path analysis according to an embodiment of the present invention.

Referring to FIG. 1, the apparatus for active identification based on gaze path analysis according to an embodiment of the present invention may include an imaging device 110 capable of capturing an image of the face of a user and an illumination module 120 capable of actively controlling illumination.

For example, an embodiment of the present invention may be a smartphone including a camera, which can be used as the imaging device 110, and a display, which can be used as the illumination module 120.

Here, any image sensor that is capable of capturing an image of a face, like a camera capable of capturing a general color image, an infrared image, a gray image, or an RGBD image, and that is capable of sensing a change in the brightness of the face caused by a change in illumination may be applied to the imaging device 110.

Here, any configuration capable of controlling the brightness and/or color of illumination so as to cause a change in the brightness or color of pixels in the face image of a user captured by the imaging device, that is, a module such as a display, flash lighting, LED point lighting, or the like, may be applied to the illumination module 120.

Figure 2:
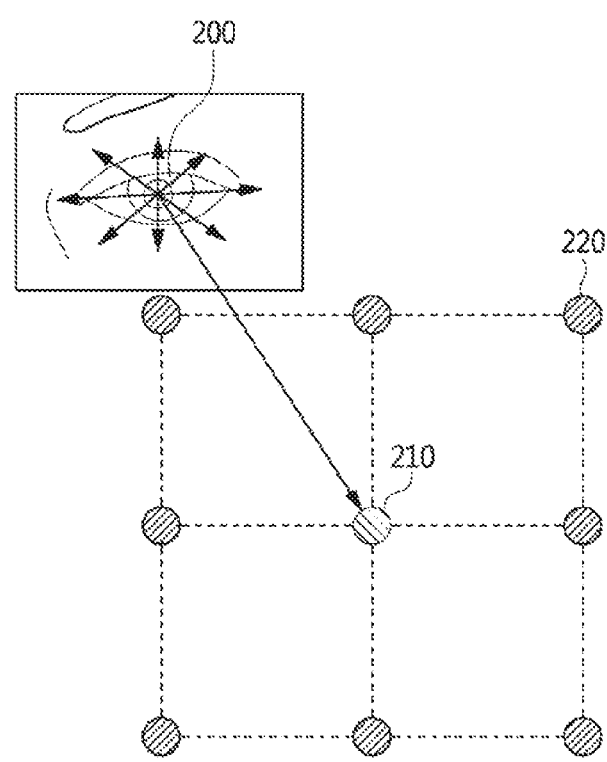
FIG. 2 is an exemplary view illustrating the process of registering a gaze path according to an embodiment of the present invention.
Figure 3:
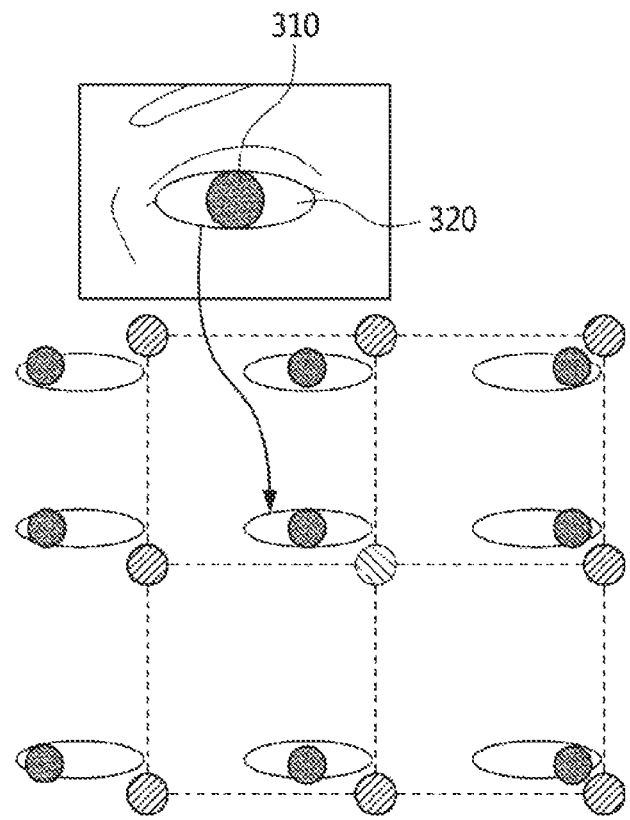
FIG. 3 is an exemplary view illustrating a change in a normalized iris and sclera according to an embodiment of the present invention.
Figure 4:
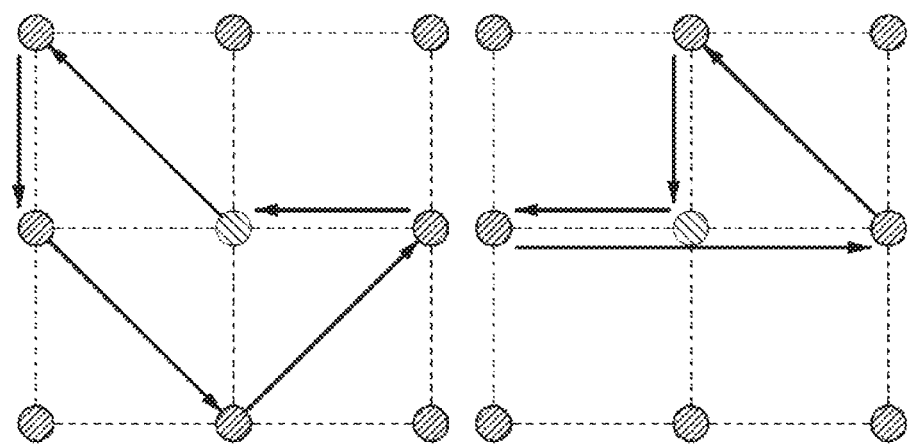
FIG. 4 is an exemplary view illustrating a gaze path according to an embodiment of the present invention.

FIG. 2 is an exemplary view illustrating the process of registering a gaze path according to an embodiment of the present invention, FIG. 3 is an exemplary view illustrating a change in a normalized iris and sclera according to an embodiment of the present invention, and FIG. 4 is an exemplary view illustrating a gaze path according to an embodiment of the present invention.

Referring to FIG. 2, in the process of registering a gaze path, a gaze path may be generated by freely moving a gaze to acceptable virtual gaze positions 210 and 220 that are present in front of the eye.

Here, the gaze positions 210 and 220 may be provided by a display, or may be automatically generated according to the movement of a gaze, without any guide.

Here, the acceptable gaze positions 210 and 220 are not displayed by a GUI on a screen so as to induce a user to gaze at the position, but may be virtually present in a space. The acceptable gaze positions 210 and 220 may be the position of a pupil moving within a range that is set based on the greatest extent to which the user is able to move his or her pupil in a direction 200 in which the user is able to move the pupil.

Referring to FIG. 3, the shapes of a sclera and iris may be different depending on the gaze position. Also, the position of an iris (or pupil) and the shape of an eye line may be different for each user, depending on a gaze position.

Here, an embodiment of the present invention may store image characteristics for each user that appear by the movement of an eyelid or the movement of a pupil, an iris, a sclera, or the like caused by gazing at the unique gaze position of the user, and may process the image characteristics in a uniform manner.

Here, the image characteristics may be represented as a model configured to with two simplified ellipses, as shown in FIG. 3, or may be characteristics (edges of the image)

acquired through image processing, such as image edge detection. For example, the two simplified ellipses may correspond to an iris 310 and a sclera 320. In this case, the image characteristics may be characteristics obtained by the image processing such as image edge detection, and may be implicit characteristics learned by using a deep-learning method based on a Convolutional Neural Network (CNN).

Here, a user may generate his or her unique gaze path by freely moving his or her gaze between acceptable gaze positions through the process of registering the gaze path illustrated in FIG. 4.

Here, whether a user is gazing at an intended gaze position may be recognized in such a way that, when a user does not change the position or direction of the gaze for a certain time period, the corresponding gaze position may be set as the intended gaze position and registered in a gaze path, whereby the gaze path may be naturally generated without a cumbersome process.

Referring to FIG. 4, an example in which the gaze path starts from a center gaze point and ends at the center gaze point in accordance with a protocol is illustrated for convenience, but an arbitrary gaze path may be generated without such a limitation by redefining the protocol for the start point.

Also, the gaze path is based not on a gaze point matching a specific position on a screen or in a space, but on a gaze point that is reachable in a comfortable state, which is assumed for each user depending on a gaze direction, and the characteristic shape of the eye at the corresponding gaze point may be used.

The above-described method has an advantage in that the gaze path intended by a user may be easily extracted without calibration of the personalized pupil model of the user, which is difficult to acquire through simple image recognition.

Also, unlike conventional methods, the above-described method according to an embodiment of the present invention enables identification to be performed using a gaze path without a display, and, through a method in which a user is not induced to move a gaze to follow a guide provided by a system but in which a gaze path is generated by the user without restrictions, high-level identification that is highly sophisticated may be provided.

Also, unlike conventional methods, the method according to an embodiment of the present invention does not request a user to change a facial expression, thereby providing user convenience while minimizing energy consumed by the user for identification. Also, the unique identification information defined by the user may be verified in a contactless manner while minimizing exposure of the identification information outside.

Figure 5:
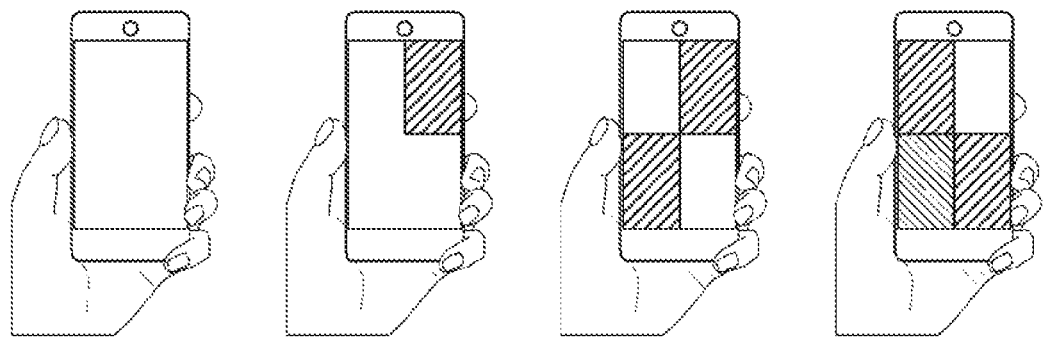
FIG. 5 is an exemplary view illustrating randomly changed illumination according to an embodiment of the present invention.
Figure 6:
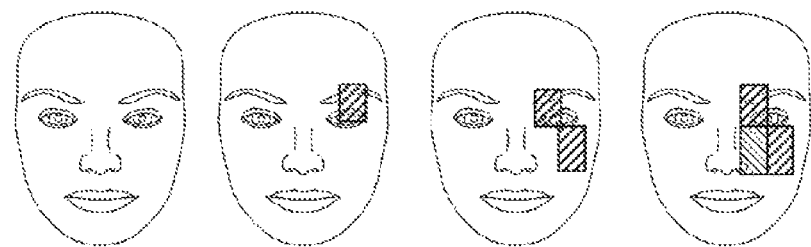
FIG. 6 is an exemplary view illustrating illumination incident on the face of a user according to an embodiment of the present invention.

FIG. 5 is an exemplary view illustrating randomly changed illumination according to an embodiment of the present invention, and FIG. 6 is an exemplary view illustrating illumination incident on the face of a user according to an embodiment of the present invention.

Referring to FIG. 5 and FIG. 6, when the process of recognizing the above-described gaze path is started, the apparatus for active identification based on gaze path analysis according to an embodiment of the present invention may illuminate the face of a user after it sets the location, brightness, color, and the like of illumination using the illumination module, and may capture the effect of the illumination appearing in the face of the user using the imaging device.

The reason for capturing the effect of the illumination is to detect an illicit attempt to falsify identity using a previously captured face image or video.

Because a human face has a 3D shape, when the face is illuminated, the effect of the illumination captured by a camera appears as different shades in an image depending on the shape and location of the face. However, when illumination is provided to an image or video, shades appearing as the result of illumination are different from shades appearing when illumination is provided to a human face. Therefore, an illicit attempt to falsify identity using a previously captured face image or video may be detected.

In an embodiment of the present invention, information about the 3D shape of a face may be required in order to detect falsification using shades that change depending on a change in illumination.

Here, the information about the 3D shape of a face may be easily acquired using depth channel information when an RGBD sensor is used, or using information about the disparity between two cameras when stereo cameras are used.

Also, an embodiment of the present invention may predict the information about the 3D shape of a face using a deep-learning method based on a Convolutional Neural Network (CNN) for a face image captured using a single RGB camera, such as a webcam or the like.

Here, an accurate scale value cannot be predicted, but the depth of each pixel relative to the depths of other pixels in the face image or the geometry of the face may be predicted. Accordingly, whether a change in the brightness of a face shown in a video sequence, which is caused due to a change in illumination, matches the shape of the face may be determined, whereby an illicit attempt to falsify identity using a previously captured image or video may be detected.

Figure 7:
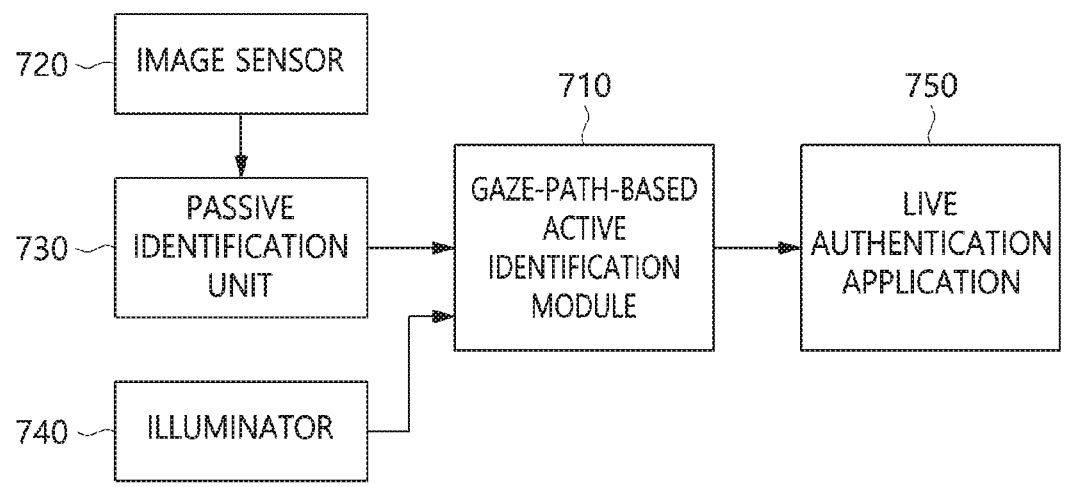
FIG. 7 is a block diagram of an apparatus for active identification based on gaze path analysis according to an embodiment of the present invention.

FIG. 7 is a block diagram of an apparatus for active identification based on gaze path analysis according to an embodiment of the present invention.

Referring to FIG. 7, an embodiment of the present invention may be implemented using a gaze-path-based active identification module 710, an image sensor 720, a passive identification module 730, an illumination module 740, and an authentication application 750.

Here, the passive identification module 730 may be any module capable of verifying the identity of a user, among conventional identification methods based on image recognition.

Here, using the gaze-path-based active identification module 710 for falsification detection and high-level identification, an embodiment of the present invention may provide the determination of liveness, that is, whether a subject is a real person, and identification information including an ID to the high-level authentication application 750.

Figure 8:
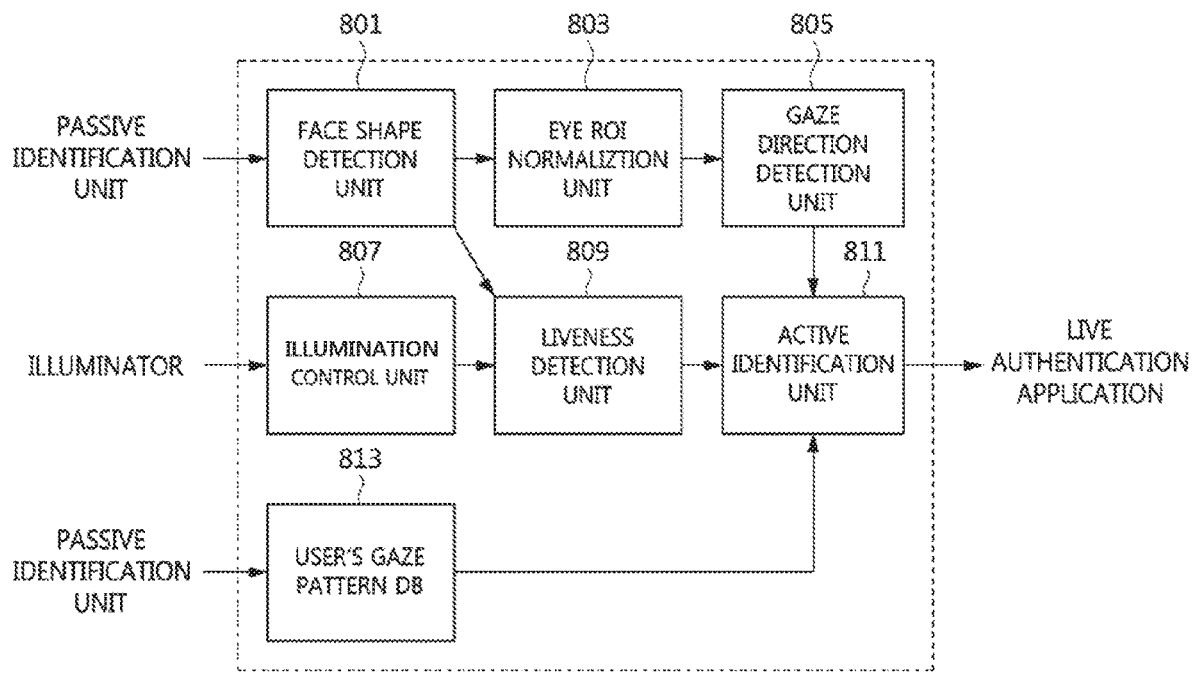
FIG. 8 is a block diagram of an active identification module based on gaze path analysis according to an embodiment of the present invention.

FIG. 8 is a block diagram of an active identification module based on gaze path analysis according to an embodiment of the present invention.

Referring to FIG. 8, the gaze-path-based active identification module 710 may include a face shape detection module 801, a normalization module 803, a gaze path detection module 805, an illumination control module 807, a liveness detection module 809, an active identification module 811, and a user gaze path database 813.

The gaze-path-based active identification module 710 may detect the face shape, facial feature information, a head pose, and the like of a user based on the face image of the user input through the image sensor, which will be described in detail later with reference to FIG. 9 and FIG. 10.

When the identity of the user is verified through the passive identification module, the process of detecting a time-series gaze path is performed, and during this detection process, the illumination module may generate random illumination by turning on or off each of the illuminators of the illumination module or changing the color of illumination provided thereby using the illumination control module.

Information about the generated illumination may be delivered to the liveness detection module 809.

The liveness detection module 809 analyzes illumination information at the time at which a face is illuminated and the effect of illumination appearing in the face in the captured image using the face shape of the user, thereby detecting whether a real person is attempting to prove his or her identity.

The detection may be achieved through image analysis on whether shades generated by the provided illumination match the shape of the face based on the face shape information acquired by the face detection module 801.

Using the fact that the shade effects achieved through illumination appear differently when the target to which illumination is provided is not a real person, the detection method is configured to extract the effect of illumination by a combination of illuminators that are randomly set in real time, in which case a CNN learning machine may be used for detecting liveness after being trained for detection.

The active identification module 811 may perform sophisticated identification by determining whether the gaze path of a user input in real time matches a gaze path stored in connection with a user ID and by detecting the liveness simultaneously with detection of the gaze path, and may provide the result of identification corresponding to the user ID to various authentication applications.

Figure 9:
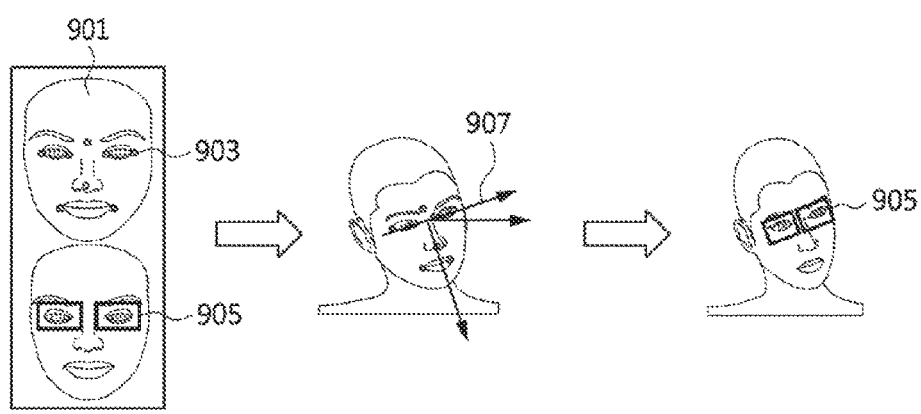
FIG. 9 is an exemplary view illustrating the process of extracting the eye area of a user according to an embodiment of the present invention.
Figure 10:
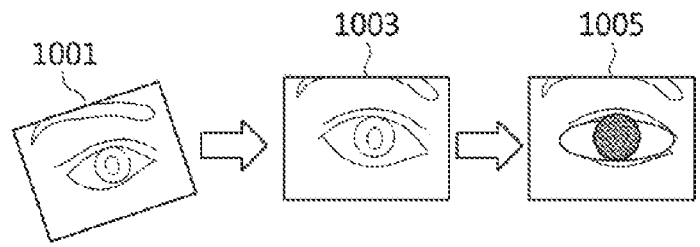
FIG. 10 is an exemplary view illustrating the process of normalizing an eye area according to an embodiment of the present invention.

FIG. 9 is an exemplary view illustrating the process of extracting the eye area of a user according to an embodiment of the present invention, and FIG. 10 is an exemplary view illustrating the process of normalizing the eye area according to an embodiment of the present invention.

Referring to FIG. 9, the face shape detection module 801 of the gaze-path-based active identification module applies a 2D-3D CNN deep-learning method to a face image input from an image sensor, as shown in FIG. 9, thereby detecting the face shape 901, the facial feature information 903, and the head pose 907 of the user.

Here, the normalization module 803 may detect the eye area 905 of the user, which is a Region Of Interest (ROI), in the image using the head pose, the 3D face shape, and the feature information 903 at outer corners of the left/right eyes.

Here, because the eye area has a different shape depending on the head pose, as shown in FIG. 10, a normalization process may be performed for calculation efficiency.

Here, in the eye area, the gaze direction may be described using yaw and pitch motions, defined by two rotation axes depending on a head pose (1001), whereby the gaze direction of the eye area may be normalized so as to be directed ahead (1003).

Here, an iris and a sclera may be extracted from the normalized eye area as features (1005), and based thereon, the gaze position may be predicted using a simple CNN deep-learning method regardless of the head pose.

Here, the gaze path detection module may detect a gaze path by connecting the gaze position in a time-ordered sequence.

Also, even though a user naturally moves and rotates the face of the user during identification, the active identification module based on gaze path analysis according to an embodiment of the present invention compensates for and normalizes the movement or rotation through the face detection module, thereby detecting a gaze path.

Figure 11:
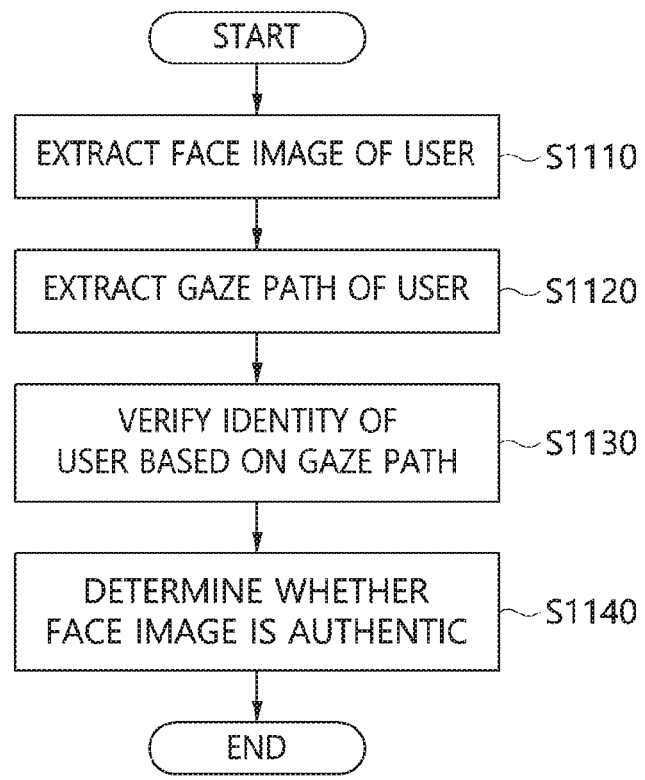
FIG. 11 is a flowchart of a method for active identification based on gaze path analysis according to an embodiment of the present invention.

FIG. 11 is a flowchart of a method for active identification based on gaze path analysis according to an embodiment of the present invention.

Referring to FIG. 11, in the method for active identification based on gaze path analysis according to an embodiment of the present invention, first, a face image of a user is extracted at step S1110.

Also, in the method for active identification based on gaze path an lysis according to an embodiment of the present invention, the gaze path of the user is extracted based on the face image at step S1120.

Also, in the method for active identification based on gaze path analysis according to an embodiment of the present invention, the identity of the user is verified based on the gaze path at step S1130.

Here, at step S1130, the gaze path is compared with a registered gaze path corresponding to the unique ID of the user, whereby the identity of the user may be verified.

Here, the registered gaze path may be set without a guide for directing a fixed gaze position by extracting the position and direction of the pupil of the user, setting a position at which the pupil is not moved for a certain time period as a gaze position, and connecting the gaze position in a time-ordered sequence.

Also, in the method for active identification based on gaze path analysis according to an embodiment of the present invention, whether the face image is authentic is determined at step S1140.

Figure 12:
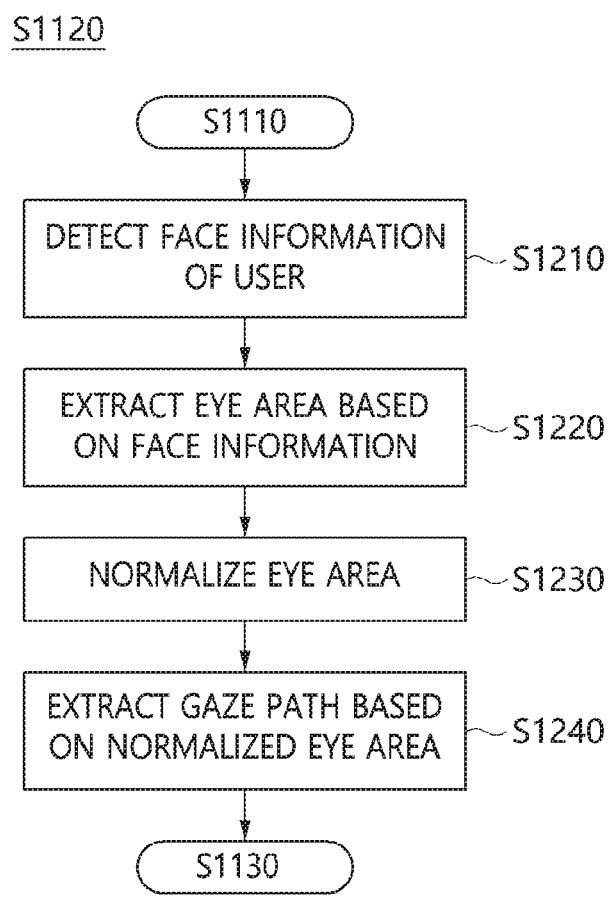
FIG. 12 is a flowchart illustrating the process of extracting a gaze path according to an embodiment of the present invention.

FIG. 12 is a flowchart illustrating the process of extracting a gaze path according to an embodiment of the present invention.

Referring to FIG. 12, extracting the gaze path at step S1120 may include extracting the face information of the user from the face image at step S1210, extracting the eye area of the user based on the face information at step S1220, normalizing the eye area based on the face information at step S1230, and extracting the gaze path based on the normalized eye area at step S1240.

Here, the face information may include face shape information, feature information including feature points of ears, eyes, a mouth, and a nose, and a head pose corresponding to the inclination of the face.

Here, at step S1220, the eye area may be extracted based on the face shape information, the feature information, and the head pose.

Here, at step S1230, the eye area may be normalized based on yaw/pitch information corresponding to the head pose such that the eye area is directed straight ahead.

Here, at step S1240, areas corresponding to an iris and a sclera are extracted from the normalized eye area, and the gaze path may be extracted based on changes in the shapes of the iris and sclera.

Figure 13:
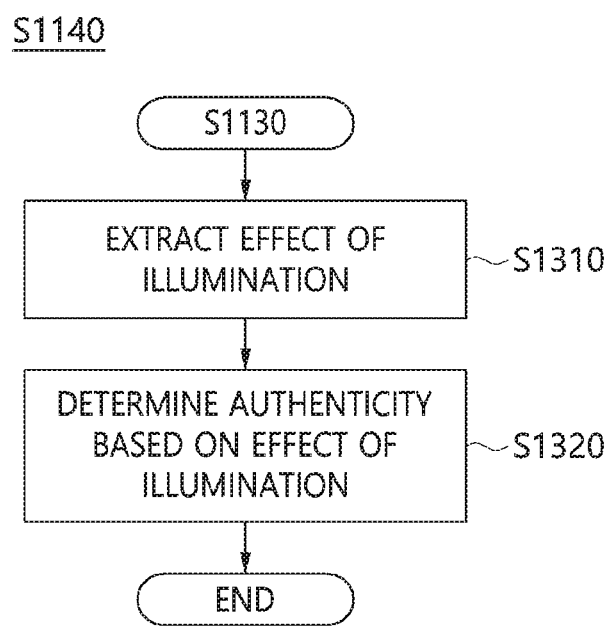
FIG. 13 is a flowchart illustrating the process of determining whether a face image is authentic according to an embodiment of the present invention.

FIG. 13 is a flowchart illustrating the process of determining whether a face image is authentic according to an embodiment of the present invention.

Referring to FIG. 13, the method for active identification based on gaze path analysis according to an embodiment of the present invention may further include illuminating the face of the user. Here, determining whether the face image is authentic at step S1140 may include extracting information about the effect of the illumination from the face image at step S1310 and determining whether the face image is authentic based on the information about the effect of the illumination at step S1320.

Here, illuminating the face of the user may be configured to provide the illumination after randomly setting at least one of the brightness of the illumination, the color thereof, and the location at which the illumination is provided.

Figure 14:
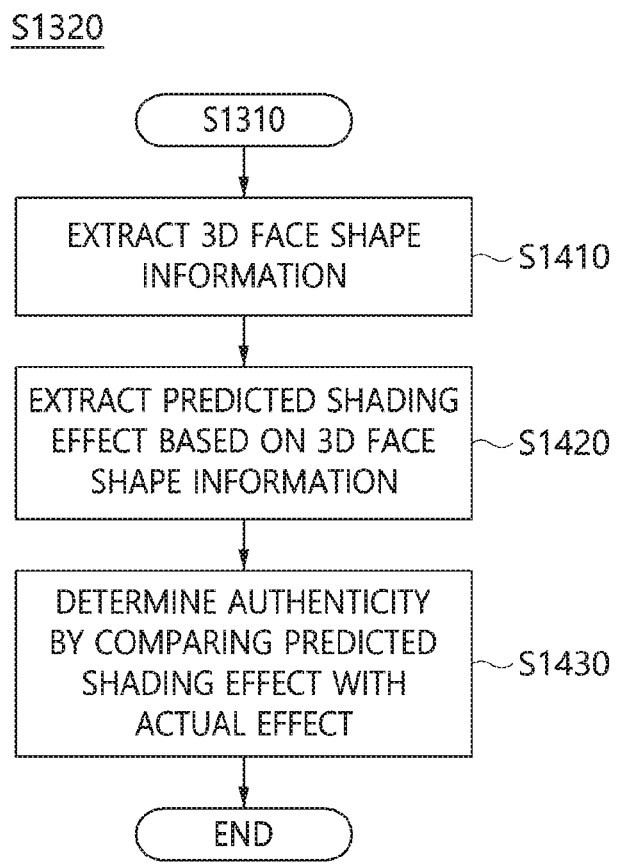
FIG. 14 is a flowchart illustrating the process of determining whether a face image is authentic based on 3D face shape information according to an embodiment of the present invention.

FIG. 14 is a flowchart illustrating the process of determining whether a face image is authentic based on 3D face shape information according to an embodiment of the present invention.

Referring to FIG. 14, determining whether the face image is authentic based on the information about the effect of illumination at step S1320 may include extracting 3D face shape information from the face image at step S1410, extracting information about a predicted shading effect of the illumination based on the 3D face shape information at step S1420, and determining whether the face image is authentic by comparing the information about the effect of the illumination with the information about the predicted shading effect of the illumination at step S1430.

Here, at step S1410, the 3D face shape information may be extracted using a deep-learning method based on a convolutional neural network (CNN), which receives the face image as input.

Figure 15:
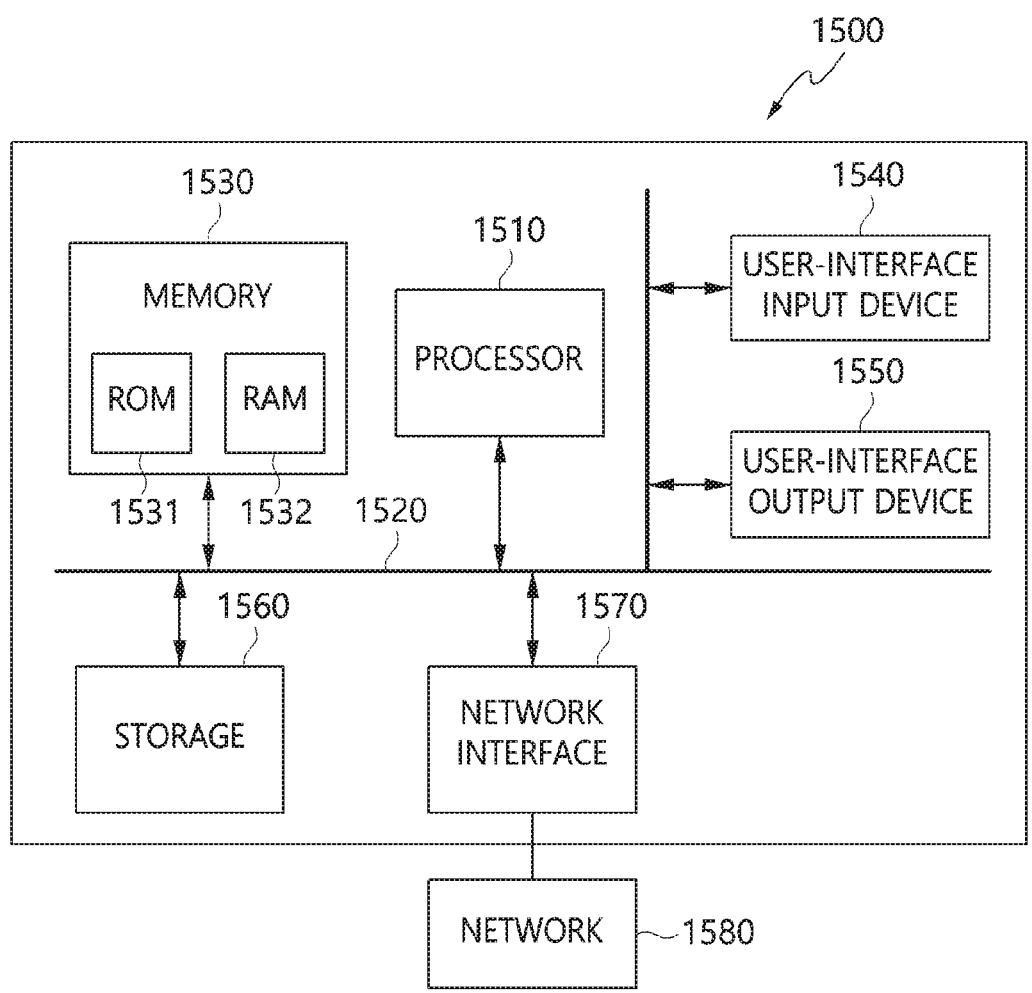
FIG. 15 is a view illustrating a computer system according to an embodiment of the present invention.

FIG. 15 is a view illustrating a computer system according to an embodiment of the present invention.

Referring to FIG. 15, an embodiment of the present invention may be implemented in a computer system including a computer-readable recording medium. As illustrated in FIG. 15, the computer system 1500 may include one or more processors 1510, memory 1530, a user-interface input device 1540, a user-interface output device 1550, and storage 1560, which communicate with each other via a bus 1520. Also, the computer system 1500 may further include a network interface 1570 connected to a network 1580. The processor 1510 may be a central processing unit or a semiconductor device for executing processing instructions stored in the memory 1530 or the storage 1560. The memory 1530 and the storage 1560 may be any of various types of volatile or nonvolatile storage media. For example, the memory may include ROM 1531 or RAM 1532.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

Here, the apparatus for active identification based on gaze path analysis includes one or more processors and executable memory for storing at least one program executed by the one or more processors. The at least one program is configured to extract the face image of a user, extract the gaze path of the user based on the face image, verify the identity of the user based on the gaze path, and determine whether the face image is authentic.

Here, the at least one program may verify the identity of the user by comparing the gaze path with a registered gaze path corresponding to the unique ID of the user.

Here, the registered gaze path may be set without a guide for directing a fixed gaze position by extracting the position and direction of the pupil of the user, setting a position at which the pupil maintains a stationary state for a certain time period as a gaze position, and connecting the gaze position in a time-ordered sequence.

Here, the at least one program may extract the face information of the user from the face image, extract the eye area of the user based on the face information, normalize the eye area based on the face information, and extract the gaze path based on the normalized eye area.

Here, the face information may include face shape information, feature information, including feature points of ears, eyes, a mouth, and a nose, and a head pose corresponding to the inclination of the face. The at least one program may extract the eye area based on the face shape information, the feature information, and the head pose, and may normalize the eye area based on the yaw/pitch information corresponding to the head pose such that the eye area is directed straight ahead.

Here, the at least one program may extract areas corresponding to an iris and a sclera from the normalized eye area and extract the gaze path based on a change in the shapes of the iris and sclera.

Here, the at least one program may extract the face image of the user after illuminating the face of the user, extract information about the effect of illumination from the face image, and determine whether the face image is authentic based on the information about the effect of the illumination.

Here, the at least one program may illuminate the face of the user after randomly setting at least one of the brightness of the illumination, the color thereof, and the location at which the illumination is provided.

Here, the at least one program may extract 3D face shape information from the face image, extract information about a predicted shading effect of the illumination based on the 3D face shape information, and determine whether the face image is authentic by comparing the information about the effect of the illumination with the information about the predicted shading effect of the illumination.

Here, the at least one program may extract the 3D face shape information using a deep-learning method based on a convolutional neural network (CNN), which receives the face image as input.

According to the present invention, whether a subject is a real person may be determined using the face image of the user and illumination capable of changing the brightness.

Also, according to the present invention, high-level identification technology may be provided by checking the unique time-series gaze path of a user.

Also, according to the present invention, technology enabling a user to generate a gaze path without a display may be provided.

Also, according to the present invention, an accurate gaze path may be extracted regardless of an eye shape, which is different for each user.

The effects of the present embodiments are not limited to the above-mentioned effects, and other unmentioned effects will be clearly understood from the following claims by those having ordinary skill in the technical field to which the present invention pertains.

As described above, the method and apparatus for active identification based on gaze path analysis according to the present invention are not limitedly applied to the configurations and operations of the above-described embodiments, but all or some of the embodiments may be selectively combined and configured, so the embodiments may be modified in various ways.

What is claimed is:
1. A method for active identification based on gaze path analysis, comprising:
  illuminating a face of the user,
  extracting a face image of a user;
  extracting a gaze path of the user, without any guide to be displayed in a display, based on the face image;

verifying an identity of the user based on the gaze path; and determining whether the face image is authentic by comparing information about an effect of illumination of the face image with information about a predicted shading effect of the illumination based on 3D face shape information of the face image.

2. The method of claim 1, wherein verifying the identity of the user is configured to verify the identity of the user by comparing the gaze path with a registered gaze path corresponding to a unique ID of the user.

3. The method of claim 2, wherein the registered gaze path is set without a guide for directing a fixed gaze position by extracting a position and direction of a pupil of the user, setting a position at which the pupil maintains a stationary state for a certain time period as a gaze position, and connecting the gaze position in a time-ordered sequence.

4. The method of claim 1, wherein extracting the gaze path comprises:
extracting face information of the user from the face image;
extracting an eye area of the user based on the face information;
normalizing the eye area based on the face information; and
extracting the gaze path based on the normalized eye area.

5. The method of claim 4, wherein:
the face information includes face shape information, feature information including feature points of ears, eyes, a mouth, and a nose, and a head pose corresponding to an inclination of a face,
extracting the eye area is configured to extract the eye area based on the face shape information, the feature information, and the head pose, and
normalizing the eye area is configured to normalize the eye area based on yaw/pitch information corresponding to the head pose such that the eye area is directed straight ahead.

6. The method of claim 4, wherein extracting the gaze path based on the eye area is configured to extract areas corresponding to an iris and a sclera from the normalized eye area and to extract the gaze path based on a change in shapes of the iris and sclera.

7. The method of claim 1,
wherein determining whether the face image is authentic comprises:
extracting the information about the effect of illumination from the face image; and
determining whether the face image is authentic based on the information about the effect of the illumination.

8. The method of claim 7, wherein illuminating the face of the user is configured to illuminate the face of the user after randomly setting at least one of a brightness of the illumination, a color thereof, and a location at which the illumination is provided.

9. The method of claim 7, wherein determining whether the face image is authentic based on the information about the effect of the illumination comprises:
extracting the 3D face shape information from the face image;
extracting information about the predicted shading effect of the illumination based on the 3D face shape information; and
determining whether the face image is authentic by comparing the information about the effect of the illumination with the information about the predicted shading effect of the illumination.

10. The method of claim 9, wherein extracting the 3D face shape information is configured to extract the 3D face shape information using a deep-learning method based on a convolutional neural network (CNN), which receives the face image as input.

11. An apparatus for active identification based on gaze path analysis, comprising:
one or more processors; and
executable memory for storing at least one program executed by the one or more processors,
wherein the at least one program is configured to illuminating a face of the user, extract a face image of a user, extract a gaze path of the user, without any guide to be displayed in a display, based on the face image, verify an identity of the user based on the gaze path, and determine whether the face image is authentic by comparing information about an effect of illumination of the face image with information about a predicted shading effect of the illumination based on 3D face shape information of the face image.

12. The apparatus of claim 11, wherein the at least one program verifies the identity of the user by comparing the gaze path with a registered gaze path corresponding to a unique ID of the user.

13. The apparatus of claim 12, wherein the registered gaze path is set without a guide for directing a fixed gaze position by extracting a position and a direction of a pupil of the user, setting a position at which the pupil maintains a stationary state for a certain time period as a gaze position, and connecting the gaze position in a time-ordered sequence.

14. The apparatus of claim 11, wherein the at least one program extracts face information of the user from the face image, extracts an eye area of the user based on the face information, normalizes the eye area based on the face information, and extracts the gaze path based on the normalized eye area.

15. The apparatus of claim 14, wherein:
the face information includes face shape information, feature information including feature points of ears, eyes, a mouth, and a nose, and a head pose corresponding to an inclination of the face, and
the at least one program extracts the eye area based on the face shape information, the feature information, and the head pose and normalizes the eye area based on yaw/pitch information corresponding to the head pose such that the eye area is directed straight ahead.

16. The apparatus of claim 14, wherein the at least one program extracts areas corresponding to an iris and a sclera from the normalized eye area and extracts the gaze path based on a change in shapes of the iris and sclera.

17. The apparatus of claim 11, wherein the at least one program extracts information about the effect of illumination from the face image, and determines whether the face image is authentic based on the information about the effect of the illumination.

18. The apparatus of claim 17, wherein the at least one program illuminates the face of the user after randomly setting at least one of a brightness of the illumination, a color thereof, and a location at which the illumination is provided.

19. The apparatus of claim 17, wherein the at least one program extracts 3D face shape information from the face image, extracts information about the predicted shading effect of the illumination based on the 3D face shape information, and determines whether the face image is authentic by comparing the information about the effect of the illumination with the information about the predicted shading effect of the illumination.

20. The apparatus of claim 19, wherein the at least one program extracts the 3D face shape information using a deep-learning method based on a convolutional neural network (CNN), which receives the face image as input.

\* \* \* \* \*